May 3, 1960

R. B. SECOR ET AL 2,935,463

METHOD OF PRODUCING CATALYSTS AND
METHOD FOR CATALYTIC CRACKING

Filed July 26, 1956

INVENTORS.
ROBERT B. SECOR & EDWARD S. PEER
By Philip Subers
ATTORNEY.

May 3, 1960

R. B. SECOR ET AL
METHOD OF PRODUCING CATALYSTS AND
METHOD FOR CATALYTIC CRACKING 2,935,463

Filed July 26, 1956

INVENTORS
ROBERT B. SECOR & EDWARD S. PEER
BY Philip Suslow
ATTORNEY.

2,935,463
METHOD OF PRODUCING CATALYSTS AND METHOD FOR CATALYTIC CRACKING

Robert B. Secor and Edward S. Peer, Whittier, Calif., assignors to Filtrol Corporation, Los Angeles, Calif., a corporation of Delaware Application July 26, 1956, Serial No. 600,284

11 Claims. (Cl. 208—120)

This invention relates to a novel catalytic material particularly useful for the catalytic conversion of hydrocarbons and more particularly useful in the catalytic cracking of petroleum fractions such as liquid petroleum fractions and also to a process for production of such catalysts and to processes of conversion and particularly cracking of liquid petroleum hydrocarbons employing such catalysts.

Processes for cracking of liquid petroleum hydrocarbon in which vapors of such hydrocarbons are passed in contact with solid catalysts at relatively high temperature, for example, about 800° to 1050° F. and cracked, forming lighter liquid hydrocarbons and gases as well as heavier hydrocarbons and coke, are well known.

In such process the coke deposits on the catalyst and such catalysts are withdrawn, usually in a continuous manner, contacted with steam at high temperature to purge the catalyst of hydrocarbon vapors and then the coke is burned off with air in a regeneration stage, in which steam is generated due to combustion of the residual hydrocarbons in the coke, and the regenerated catalyst returned to the hydrocarbon conversion zone.

Catalysts which have been employed commercially are of two classes, the so-called synthetic silica-alumina catalysts and natural catalysts formed by acid leaching of bentonite clays or kaolin type clays.

Such catalysts are steam sensitive in that on exposure to steam at high temperatures during processing as above, their catalytic activity is altered.

We have found that we can materially improve the catalytic activity of such catalysts on exposure to steam at high temperature, by incorporating as a catalytic promoting agent, hydrated alumina formed by reaction of an aluminum salt in alkaline medium, particularly aqua ammonia in which the reaction is conducted in a highly alkaline solution. In such procedures, the temperatures reached in the production of the catalyst cause a dehydration of the hydrated alumina. The catalyst according to our invention has the following characteristics:

(1) It has as a substrate or support a material which may be either high or low in catalytic activity. When employing clays we may use either the acid treated clays, or in the case of clays of the kaolin type, without prior acid treatment.

(2) Deposit of hydrated alumina gel is formed on such substrate. The hydrated alumina gel is formed in a preferred embodiment of our invention by reacting an aluminum salt, for example, aluminum alum with $NH_4OH$ in such manner that the sulfate and the resultant hydrated alumina gel is at all times, prior to removal of the aqueous solution from the gel, in the presence of free $NH_4OH$, and at all times at a pH in excess of 10.

(3) This mixture thus produced may be converted into pellets or produced in finely divided form such as microspheres and employed in the usual manner in cracking operations.

The catalysts formed in the above manner when compared to the substrate from which they are formed show enhanced catalytic activity when these catalysts are exposed to high temperature in the presence of steam. In fact we may obtain catalysts which on steaming show catalytic activities in excess of the catalytic activity of the substrate when exposed to like steaming conditions.

It is therefore an object of my invention to produce catalysts which may be employed in the cracking of petroleum by incorporating into catalytic substrates, alumina in such manner as to give catalysts which show higher cracking activity when exposed to steam at high temperatures than do the substrates when similarly treated.

This invention will be further described in connection with the drawings of which.

Figure 1:
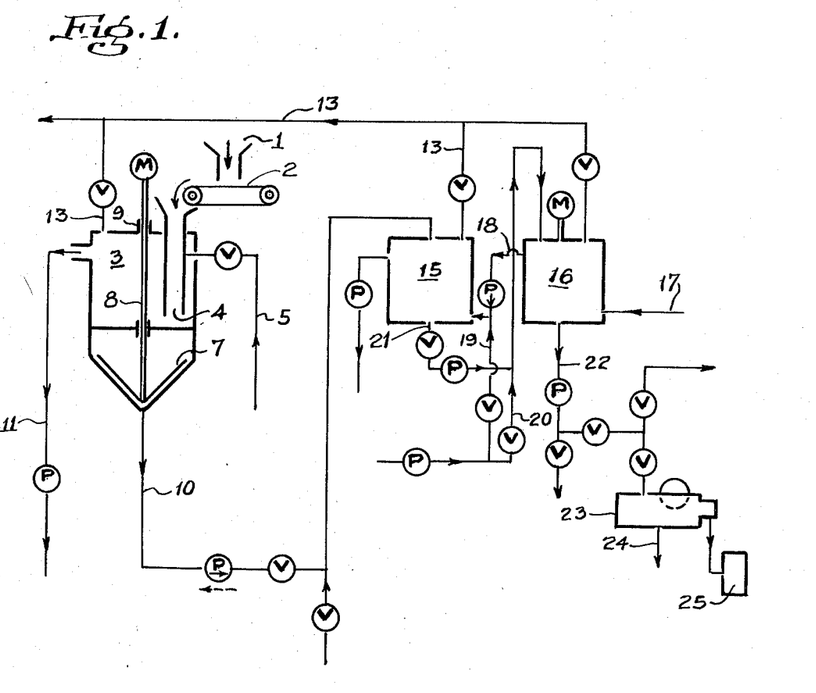
Fig. 1 illustrates a schematic flow sheet of a process for making the hydrated alumina gel which is employed in making the catalyst according to our invention.

In Fig. 1 is illustrated a procedure in which the hydrated alumina employed in our catalyst is formed directly.

The alum crystals are fed via hopper 1 and conveyor 2 into exchangers 3 in which the crystals descend through open ended tubular members 4 forming a vapor-tight seal with the tank body of the exchanger 3. The exchanger is full of an aqueous solution of free ammonium hydroxide fed to the tank via line 5 into the tube 4 and into the exchanger 3. A rake 7 actuated by a motor via a shaft 8 passing through a vapor tight gland 9 aids in the discharge of the slurry of hydrated alumina via discharge line 10. The recovered ammonium sulfate solution containing free $NH_4OH$ is discharged in line 11. Free $NH_3$ vapors formed in the vapor space of the exchanger 3 are discharged for such use as may be had for $NH_3$ through collector line 13.

The hydrated alumina slurry passes to staged washing and settling thickeners in which it is washed and the slurry concentrated by sedimentation to increase the solids content of the slurry and reduce the ammonium sulfate content of the liquor, while controlling the free $NH_4OH$ content to maintain the desired degree of alkalinity in the solution. Various types of such thickeners are known. (See for example the counter-current tray thickeners illustrated at page 942. "Chemical Engineers Handbook," edited by John H. Perry and published by McGraw-Hill Book Co., Third Edition, hereafter referred to as "Chemical Engineers Handbook.") In Fig. 1 a five tray unit is illustrated at 15 and another at 16. We shall refer to the trays as 1 to 10 in the direction of the flow of the thickened alumina hydrate slurry.

The slurry of hydrated alumina passes via line 10 into tray 1 of the thickener 15 and the partially washed and partially thickened slurry of hydrated alumina is withdrawn from tray 5 of thickener 15 via 21 and introduced into tray 6 of the washer and thickener 16. The thickened slurry is withdrawn from tray 10 of thickener 16 via 22.

Hot distilled water is introduced via 17 into tray 10 of the thickener 16, passes counter current to the descending hydrated alumina slurry in 16 and discharges from tray 6 and is pumped via line 18 where it meets injected $NH_3$ gas introduced via line 20 from a suitable source to insure the presence of free $NH_4OH$ in the wash liquor.

The resultant solution is introduced into tray 5 and passes counter to the alumina slurry introduced via 10 into tray 1. Free $NH_3$ gas discharging from the solutions in the thickeners 15 and 16 are collected via $NH_3$ collecting lines 13.

The thickened slurry is passed to a filter 23 which may be of the continuous rotary type and the filtrate discharged via 24 and the wet filter cake passed into wet cake storage 25.

The following example of the above process is given by way of illustration and not as a limitation of our invention.

EXAMPLE 1

Alum crystals produced as a filter cake in an ammonium alum process employing as a feed liquor an acid leach solution resulting from the production of acid treated clay halloysite or bentonite catalysts is employed in this example. The alum filter cake composition is—

| | Percent |
|---|---|
| Ammonium alum ($NH_4Al(SO_4)_2 12H_2O$) | 93 |
| $FeSO_4$ | 0.003 |
| $MgSO_4$ and $CaSO_4$ | .055 |
| Remainder water. | |

The alum crystals had a mesh analysis of through 16 mesh and on 100 mesh and are fed continuously into the exchanger wherein ammonia solution containing 28% $NH_3$ in solution as ammonium hydroxide is fed through 5. The dwell time in the exchanger may vary, from a few minutes to several hours, however 30 minutes is satisfactory. Ambient atmospheric temperature exists, for example, 80° F. An exchange occurs in the reactor to form precipitated hydrated alumina and ammonium sulfate solution. The hydrated alumina appears to be pseudomorphic after the alum crystals in that the shape of the aggregates of the alum crystals and their particle size are preserved in the alumina gel which settles to the bottom of the exchanger and is withdrawn via line 10.

The ammonium sulfate solution withdrawn from 11 contains considerable free ammonium hydroxide, i.e., from about 4 to 5% calculated as $NH_3$. At such high concentrations the pH has little significance but on measurement, pH values from 10 to 11 are observable in such solutions.

Due to the presence of $NH_3$ gas in the vapor space of the exchanger, such liberated $NH_3$ gas is withdrawn through the gas collecting lines 13.

The slurry withdrawn from 10 contains alumina hydrate which contains, depending on the degree of exchange, some unexchanged or partially exchanged alum. The solution contains ammonium sulfate and free $NH_4OH$. A typical ratio of the weight of $NH_4OH$ calculated as $NH_3$ to the weight of $(NH_4)_2SO_4$ in the slurry is about 1 to about 5, containing, for example, $NH_4OH$ (calculated as 3% free $NH_3$ in solution). Thus considerable excess of free $NH_4OH$ is maintained in contact with the alumina throughout its history in the exchanger.

The washing and thickening operation is also controlled so that the wash water contains free $NH_4OH$, in order to assist in the removal of ammonium sulfate so as to control the final sulfate content of the hydrated alumina. For this purpose $NH_3$ is added to establish, in the wash liquor passing via 18, a free $NH_4OH$ content of about 1.75% to 2.0% (calculated as free $NH_3$) in solution at stage 5 of 15. The feed to the thickeners via 10 is at the previously mentioned ambient temperature, the distilled wash water added via 17 is hot, for example, 190° F. The temperature in line 21 which transfers the partially washed alumina to tray 6 in thickener 16 is, for example, about 160° F., the discharge via line 22 is at about 180° F.

The washing technique is controlled since excessive washing with $NH_4OH$ solution or prolonged contact with $NH_4OH$ produces an excessive lowering of the sulfate content and a material depreciation in the hardness of the resulting calcined catalysts. We do not know whether there is any chemical correlation between sulfate content and hardness and report only that excessively low sulfate content in the hydrated alumina produced as above when incorporated into catalysts, according to our invention, results in catalyst pellets and granules of impaired hardness. The sulfate content may be used as an index for treatment to produce catalysts of desirable hardness. We find, however, that the hydrated alumina gel as formed on filtration as above shows about 35% of alpha monohydrate form of the hydrated alumina also known as boehmite, the remainder is composed of the trihydrate forms including both amorphous trihydrate and also the beta-trihydrate also known as bayerite, as determined by differential thermal analysis in the method now fully identified below.

As will be more fully disclosed below, we prefer to form the hydrated alumina so as to limit the amount of bayerite by limiting the amount of sulfate left remaining in the hydrated alumina. However, we have found that the inclusion of a high concentration of sulfate in the alumina reduces the activity of the catalyst and thus we have found it desirable that the sulfate content, expressed as $SO_3$, of the washed precipitated hydrated alumina be not in excess of about 9% by weight of the volatile free solid, i.e., in calcination to $Al_2O_3$. Some improvement is also obtained by reduction to about 5%. From the catalytic viewpoint no substantial improvement in catalytic efficiency has been observed by reducing the sulfate content below about 5 to 6% by weight, expressed as $SO_3$, based on the volatile free solid. However, in order to obtain the proper gel form for further processing, according to our invention, and to obtain hard agglomerates, we prefer that the sulfate content expressed as $SO_3$, be not less than about 1.5% based on volatile free solids as above. As a general rule we prefer about 2 to 5% with 2.5% by weight expressed as $SO_3$ and based on volatile free solids as above preferred.

With such controls we may keep the bayerite content of the hydrated alumina below about 40% and the amorphous hydrated alumina above about 15%, the remainder being boehmite. As a general rule the boehmite content remains substantially constant at about 35% and independent of the sulfate content.

A preferred range is about 35% boehmite, about 10 to about 15% bayerite, and the rest amorphous alumina hydrate, all such values determined by differential thermal analysis as herein described.

The alumina thus formed has unique properties for the beneficiation of substrates as will be further explained below, and may be incorporated into such substrates to form catalyst particles in pelleted form and also as fine granules.

In producing the pelleted form of catalyst such as is employed in moving bed catalytic processes, for example, the so-called T.C.C. Process widely used commercially throughout the world, the procedure set forth in Fig. 2 may be followed.

Figure 2:
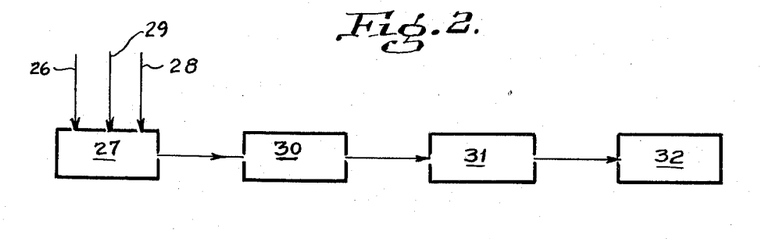
Fig. 2 is a schematic flow sheet for making a pelleted catalyst according to our invention.

The wet filter cake in 25 is introduced via 26 into a Muller type mixer 27 (see for example one illustrated in "The Chemical Engineers Handbook," page 1214). The mullers are then started, a substrate base to be used as a support for the hydrated alumina is introduced via 28. For example, we may employ an acid treated halloysite catalyst. In order to assist in the production of porous pellets we add some wood flour via 29. The materials are added in such proportion and mixed for a time determined by the percent of the alumina required for beneficiation and the plasticity required for extruding to form pellets. A specific example of an analysis of the mix, for illustrative purposes, may be on a moisture free basis 14.7% of alumina and 79.3% of active halloysite and 6% wood flour. The moisture content is adjusted to that required for extrusion, for example, about 45% by weight of the moisture free mixture. The mulling is continued for about 20 minutes. The mixed materials are then passed to an auger type extruder 30 wherein the plasticized mass is extruded through dies like spaghetti and the spaghetti cut off into pellets, for example, 3/16" diameter 3/16" long pellets.

Figure 3:
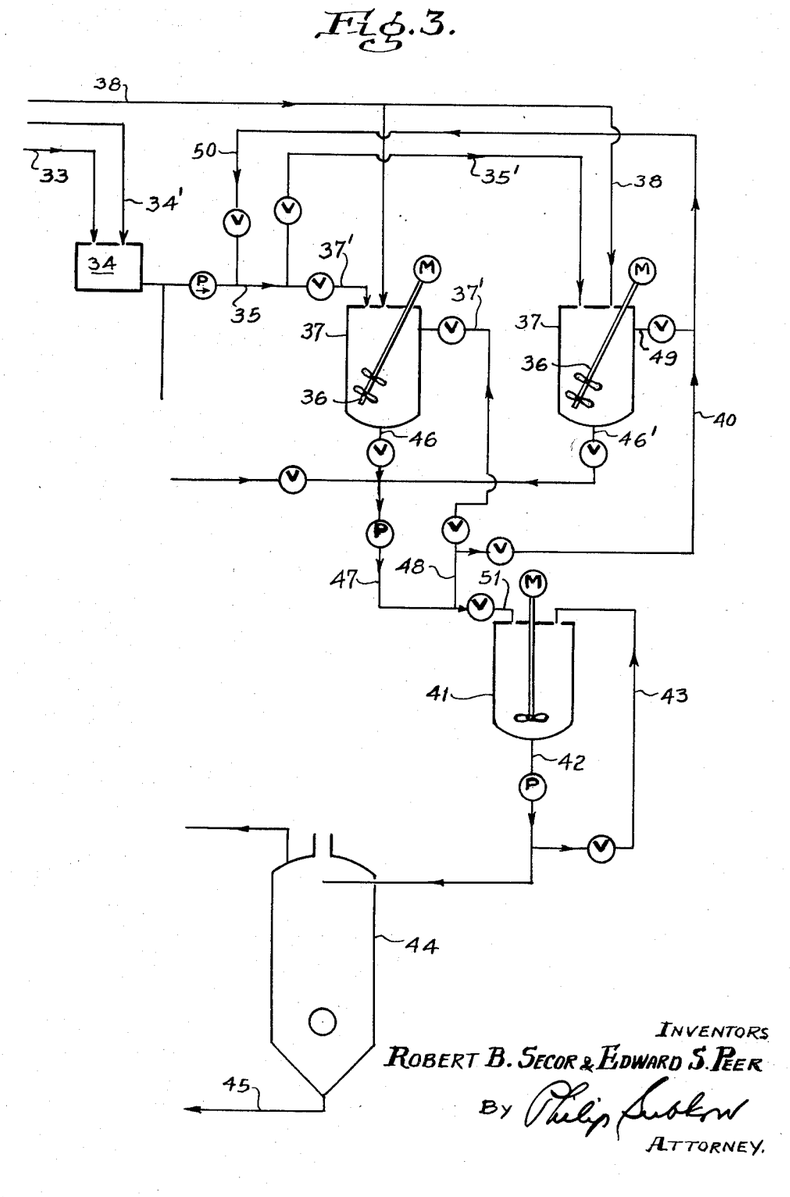
Fig. 3 is a schematic flow sheet for making granular finely divided catalyst according to our invention.

These pellets pass to a drier 31 where they are dried slowly at a relatively low temperature, for example, not to exceed 160° F. for a period of 8 hours in hot flue gas containing an excess of air. The volatile content of the pellets is thus reduced from 45% to about 18%. To produce the commercial pellets, the dried pellets are calcined in calciner 32 with flue gas containing an excess of air and some steam at a temperature of 900–1050° F. for 8 hours. The wood flour is burned out by this procedure and hard porous pellets are formed. The volatile matter is reduced by this process from about 18% to about 5% by weight.

Where it is desired to employ the catalyst in a fluid catalyst system in which finely divided catalyst is to be employed as is conventional in such systems, we may employ the procedure illustrated in Fig. 3 or we may grind up extruded pellets formed as above with or without employing the wood flour. In Fig. 3, the alumina cake in storage chamber 25 is passed via 34' into a repulping vessel 34 into which water through 33 is introduced. It may of course be passed directly from 23 with repulping water. In either case it is passed together with recirculated material via 35 and 35' or 37' into one or the other of the contacting vessels 37 provided with mechanical agitation 36 to establish a mixture, for example, containing about 12% solids. Acid treated halloysite similar to that employed in Example 1 (for example halloysite treated with 140 lbs. of 29% $H_2SO_4$ per 100# of raw halloysite (calculated as volatile free halloysite) treated with sulfuric acid at about the boiling point of the sulfuric acid, for a time sufficient to leach the halloysite. A moisture content of about 15 to 20% may be taken as a characteristic figure for halloysite.

The amount of halloysite added via 38 will depend on the ratio of the alumina to the halloysite desired in the finished catalyst. The agitation in 37 is continued until a thorough mixture is obtained and part of the material is recirculated via 46 or 46', 47, 48 and 40 and via 49 or 50 back to the tanks 37, and part passed to the storage tank 41 via 51 where it is kept agitated and recirculated via 42 and 43 to prevent segregation. The aggregates from 41 may be dried and pelleted. Instead, however, the aggregates from 41 are passed into a spray drier 44 such as is illustrated in "Chemical Engineers Handbook," page 842. The spray drier reduces the volatile matter content, for example, from about 85% to about 20% from which the catayIst may be withdrawn in finely divided spherical form. The alumina content may be in the same range as in the case of the pelleted catalyst.

Instead of employing spray drying, the mixture may be made in the muller of Fig. 2, omitting the wood flour passed to the drier instead of the extruder dried and ground if desired.

The following examples illustrate the catalytic efficiency of the catalyst produced according to our invention.

In all of the following examples, unless otherwise stated, the alumina is that produced according to Example 1.

The following examples report the results obtained by using the catalyst in a test known as Cat A test and reported by J. Alexander and H. Shimp in National Petroleum News, Technical Section, August 2, 1944, beginning on page R527. This test has been used extensively in the cracking art to compare and rate the activity and selectivity of catalysts as between themselves and against selected standards. The results as here reported apply to the catalysts in the above test, on the same feed stock. Yield of gasoline is given as the total liquid, generally $C_5$ and up to a 410° F. end point on a "no loss basis," i.e., corrected for all losses in the test reported as percent by volume based on the volume of liquid gas oil feed. Gas, generally $C_4$ and lighter, is reported as weight percent of the gas based on the weight of the feed. Gas density is reported as against air=1. Carbon percentages are given as weight percent of the feed. It is to be noted that this test of the pelleted catalyst requires a calcination of the pellets at a temperature of 1050° F. The catalysts were extruded through an auger extruder, omitting, however, the wood flour, dried at 200–300° F. as described above and calcined at 1050° F. in accordance with the Cat A procedure prior to test.

The activity of catalysts is compared by comparing the volume percent yields of gasoline produced.

Clays may be lightly acid treated to remove iron by employing acids only in amounts, concentration and temperature sufficient to deiron the clay, for example, to remove contaminating ferruginous material such as $Fe_2O_3$ or FeS. They may however be more extensively leached by a more vigorous acid treatment.

Where we report a content of volatile matter (percent V.M.) such as moisture or analysis based on volatile free solids, we mean an analysis wherein the solids are weighed before and after heating to constant weight in air at a temperature of 1700° F. according to procedures described.

Catalyst prepared as described in each example was sampled for test by the Cat A method. In producing the catalyst by extrusion for Cat A test, the procedure of Example 1 was followed except that no wood flour was used and the extrusion V.M. was adjusted to about 45% V.M. and then the pellets were dried as above, calcined and tested according to the Cat A procedure.

In order to determine the stability of the activity when subjected to prolonged exposure to steam at high temperatures, the pelleted catalyst after subjection to the Cat A test as previously described, was steamed by the so-called "G" test commonly used to determine the "steam stability" of cracking catalysts. In this test the catalyst removed from the Cat A apparatus is placed in a tube and heated to 1350° F. and 100% steam is passed over the catalyst at such temperature for four hours. No additional calcination of the catalyst is employed and the steamed catalyst was subjected to cracking by the Cat A procedure.

When the unsteamed catalyst is used in the Cat A cracking process in the following examples, we report the results as "Fresh," i.e., "F." When the catalyst used in the Cat A is one which has been subjected to the above "G" steaming procedure the results are reported as "Steamed," i.e., "S." Whenever the percent of alumina added is reported, the weight percent of the hydrated alumina added is calculated as anhydrous alumina as a weight percent of the volatile free substrate base, i.e., parts of alumina added calculated as $Al_2O_3$ based on 100 parts of volatile free substrate.

EXAMPLE 2

A natural catalyst was prepared by beneficiating halloysite clay from the Dragon Mine located near Eureka, Utah. A typical analysis of halloysite from this mine is as follows:

Percent $Fe_2O_3$=0.63
Percent $Al_2O_3$=49.3
Percent $SiO_2$=51.3

The halloysite is crushed and then leached with a mineral acid. Although a number of acids may be used in the leaching operation, in this instance, sulfuric acid at a concentration of 23% was used at a temperature of approximately 205° F. for 5 hours. The leached halloysite was water washed, dried and sized. This was pelleted in a manner similar to that described in connection with Example 1, but with no alumina added. This is Sample 1 of Example II. The natural halloysite catalyst had the following chemical composition.

Chemical analysis:

Percent $Fe_2O_3$=.35
Percent $Al_2O_3$=39.8
Percent $SiO_2$=60.6

This natural catalyst was mixed with the unique alumina above described. Although varying proportions of this natural catalyst to alumina may be used, e.g., 100 parts of catalyst (dry basis) to from 12½ to 35 parts of alumina ($Al_2O_3$ basis), the preferred and most economical mixture is 100 parts of catalyst to 15 to 25 parts of alumina.

Another portion of the natural catalyst used in preparing the pellets as above was in the unpelleted state mixed with varying amounts of hydrated alumina prepared as in Example 1. Thus, four samples were formed containing 15, 40, 65 and 100 parts of hydrated alumina (calculated as $Al_2O_3$) per hundred parts of the granular and treated halloysite (calculated as free of volatile matter) referred to herein respectively as Sample 2, Sample 3, Sample 4 and Sample 5 in the order of increasing amounts of $Al_2O_3$ added. The resultant granules carrying the above hydrated alumina were (extruded), dried and then one portion subjected to calcination and cracking by the Cat A test, discharged from the Cat A test, "G" steamed, and then retested by Cat A.

The results obtained are given in Table 1.

Table 1

|  | Percent Gasoline | | Percent Gas | | Percent C | | Gas Density | |
| --- | --- | --- | --- | --- | --- | --- | --- | --- |
|  | F | S | F | S | F | S | F | S |
| Sample 1 | 33.3 | 27.4 | 7.25 | 4.76 | 3.58 | 2.00 | 1.16 | 1.04 |
| Sample 2 | 39.1 | 32.3 | 12.45 | 6.82 | 5.55 | 2.88 | 1.01 | 1.13 |
| Sample 3 | 38.3 | 36.8 | 13.3 | 8.83 | 6.47 | 3.80 | 1.14 | 1.05 |
| Sample 4 | 37.7 | 36.8 | 12.0 | 9.8 | 6.42 | 3.78 | 1.15 | 1.28 |
| Sample 5 | 34.1 | 35.2 | 10.6 | 9.7 | 5.64 | 3.70 | 1.16 | 1.29 |

It will be observed that as compared with the acid treated halloysite, Sample 1, the addition of the alumina according to our invention produced a catalyst (Samples 2 to 5 inclusive) which not only had a higher activity as represented by the gasoline yield but that this activity was higher after steaming. Thus, as compared with the steamed Sample 1, the catalyst of our invention had a higher activity before steaming than did the fresh substrate halloysite catalyst and the activity of the catalyst of our invention after steaming had a higher activity than did the steamed substrate. In fact, the catalysts above 15% $Al_2O_3$ added showed higher steamed activity than the fresh activity of the substrate and unlike the substrate the activity is not substantially depreciated and may be appreciated by steaming as compared to the substrate which suffered a marked depreciation of activity on steaming.

Similar results are obtained when using other substrates.

EXAMPLE 3

In the following examples a kaolinite clay which was deironed by a light acid wash to remove iron was used.

A typical analysis:
.27% $Fe_2O_3$
43.8% $Al_2O_3$
Balance $SiO_2$

This clay was beneficiated by crushing and leaching to remove contaminating iron oxide. Although a number of acids may be used in the leaching operation, in this instance sulfuric acid at a concentration of 10% was used at a temperature of approximately 200° F., for 4 hours. Leaching reduced the iron content to 0.08% $Fe_2O_3$ and about 43.0% $Al_2O_3$. The leached clay was water washed, dried and sized.

Its moisture content was adjusted to an extrusion content of moisture about 45% volatile matter, extruded and dried to about 15 to 20% volatile matter in the manner described above. This is called Sample 2.

Similarly a sample of the raw kaolinite, not acid washed was extruded and dried in a manner similar to the acid washed kaolinite clay. This is called Sample 1.

Another sample, the kaolinite which was acid washed kaolinite used to produce Sample 2 was mixed with hydrated alumina in the manner of the samples of Example 2 and then pelleted as described above. Sample 3 had 15% $Al_2O_3$ added.

The raw kaolinite used to produce Sample 1 was mixed with same hydrated alumina used in preparation of Sample 3 and processed as in Sample 3 and in the same ratio. This is called Sample 4.

Samples of all of the above were calcined or steamed and subjected to the Cat A test as in Example 2. The results obtained are as follows:

Table 2

|  | Percent Gasoline | | Percent Gas | | Percent C | | Gas Density | |
| --- | --- | --- | --- | --- | --- | --- | --- | --- |
|  | F | S | F | S | F | S | F | S |
| Sample 1 | 12.9 | 13.3 | 1.67 | 1.28 | 2.68 | 1.36 | 0.45 | 0.45 |
| Sample 2 | 19.2 | 15.3 | 1.08 | .99 | .84 | .61 | 1.27 | 1.17 |
| Sample 3 | 22.6 | 29.2 | 3.43 | 3.21 | 1.80 | 1.41 | 1.01 | 1.26 |
| Sample 4 | 18.2 | 22.2 | 3.07 | 3.64 | 3.68 | 1.73 | .67 | .80 |

A similar result was obtained to that obtained when employing acid leached sub-bentonite clay produced by leaching a bentonite of the non-swelling type (Cheto bentonite) such as used heretofore in producing a leached bentonite clay cracking catalyst.

EXAMPLE 4

A typical analysis of bentonite from the Cheto mine is as follows:
Percent $Al_2O_3$=20.8
Percent $SiO_2$=67.3
Percent $TiO_2$=0.3
Percent $Fe_2O_3$=1.85
Percent MgO=6.4
Percent CaO=3.2

To prepare a catalyst from this bentonite, the bentonite is crushed and then leached with sulfuric acid. A starting concentration of 35–40% was used at a temperature of approximately 220° F. for 3–4 hours. The leached bentonite was water washed, dried and sized. This leached bentonite had the following chemical composition.

Chemical analysis:
Percent $Al_2O_3$=17.1
Percent $SiO_2$=72.6
Percent $Fe_2O_3$=1.6
Percent MgO=4.9
Percent CaO=3.7
Percent $SO_3$=2.9

A portion of the acid treated bentonite was extruded and dried as in Example 3. This is referred to as Sample 1. A portion of the pelleted clay (Sample 1) was subjected to calcination and cracking according to the Cat A procedure and then subjected to steaming according to the "G" procedure and subjected to cracking according to the Cat A procedure.

Another portion of the unpelleted catalyst was mixed with hydrated alumina produced as in Example 2 and pelleted and dried as described above to produce a pelleted catalyst containing 20% $Al_2O_3$ added. This is referred to as Sample 2. A portion of the pelleted catalyst is calcined and another steamed and both subjected to the Cat A cracking test as described above for the pelleted and treated bentonite catalyst. The results obtained are given below:

Table 3

|  | Percent Gasoline | | Percent Gas | | Percent C | | Gas Density | |
| --- | --- | --- | --- | --- | --- | --- | --- | --- |
|  | F | S | F | S | F | S | F | S |
| Sample 1 | 38.9 | 31.1 | 7.46 | 2.96 | 4.63 | 2.13 | 1.31 | 1.16 |
| Sample 2 | 39.4 | 33.9 | 10.11 | 4.57 | 5.46 | 2.71 | 1.37 | 1.29 |

The effect of the alumina content is illustrated in the following: A sub-bentonite from the same location, as used in Sample 1, was similarly leached. Instead of extruding clay as above, it was pilled in a pilling press by compression after adjusting the V.M. for such purpose. This is referred to as Sample 3.

Another portion of the acid treated clay used in making Sample 3 was mixed with hydrated alumina as in the case of Sample 2, only 2.5% of $Al_2O_3$ added. This is referred to as Sample 4.

Another portion of the acid treated clay used in making Sample 3 was treated as in the case of Sample 4 but 5% of $Al_2O_3$ was added. This is referred to as Sample 5.

Samples 3, 4 and 5 were each calcined and subjected to Cat A with the following results:

Table 4

|  | Percent Gasoline | Percent Gas | Percent Carbon | Gas Density |
| --- | --- | --- | --- | --- |
| Sample 3 | 39.8 | 5.5 | 4.6 | 1.48 |
| Sample 4 | 42.6 | 6.6 | 4.6 | 1.46 |
| Sample 5 | 42.7 | 7.6 | 4.6 | 1.44 |

The addition of the alumina improved the catalytic activity in both the fresh and steamed state.

EXAMPLE 5

The hydrated alumina formed as in Example 1, promotes and improves the activity of the synthetic silica-alumina catalyst formed by incorporation of alumina on silica gel by precipitation from sodium aluminate solution, washing to remove sodium ions, spray-drying the catalyst to form micro spheres.

Sample 1 is such a synthetic silica-alumina catalyst containing 13% $Al_2O_3$ and 87% $SiO_2$.

Sample 2 was formed by incorporating into Sample 1, 15% of $Al_2O_3$ by the same procedure as described in Examples 2–4 for incorporation of hydrated alumina into the clay catalysts.

Sample 3 was formed as in the case of Sample 1 but using enough of the sodium aluminate to produce a catalyst containing 25% $Al_2O_3$.

Each of these catalysts were subjected to Cat A cracking, one part being calcined and another part subjected to the "G" steaming procedure. The results are given in Table 5.

Table 5

|  | Percent Gasoline | | Percent Gas | | Percent Carbon | | Gas Density | |
| --- | --- | --- | --- | --- | --- | --- | --- | --- |
|  | F | S | F | S | F | S | F | S |
| Sample 1 | 47.7 | 37.1 | 18.7 | 4.17 | 6.94 | 1.74 | 1.69 | 1.47 |
| Sample 2 | 48.8 | 39.5 | 17.8 | 6.50 | 6.47 | 2.60 | 1.60 | 1.41 |
| Sample 3 | 43.5 | 36.6 | 16.6 | 5.21 | 6.2 | 2.1 | 1.57 | 1.56 |

It will be observed that the addition of the form of hydrated alumina, used in forming the catalyst of our invention to the synthetic catalyst, improved the fresh and steamed catalytic activity of the catalyst. A comparison of Sample 2 and Sample 3 will show the superior promoting activity of the hydrated alumina employed in our invention.

The effect of the sulfate content of the hydrated alumina employed in forming the catalyst of our invention and referred to above is illustrated by the following example:

EXAMPLE 6

Samples of acid treated halloysite catalyst were mixed with enough hydrated alumina as in Example 3 to give 15% $Al_2O_3$ added. The alumina employed for each sample was formed as in Example 1 but the washing with the ammonia was carried out to give various levels of sulfate content as given below. Thus—

Sample 1 is the acid treated halloysite pelleted and dried without addition of alumina.

Sample 2 was formed using an alumina containing sulfate 9.5% by weight calculated as $SO_3$, and based on $Al_2O_3$.

Sample 3 was formed using the hydrated alumina reduced in sulfate content to 5.38% by weight calculated as $SO_3$, and based on the $Al_2O_3$.

Sample 4 was formed using the hydrated alumina washed to reduce the sulfate content to 1.4% by weight calculated as $SO_3$ and based on the $Al_2O_3$. Differential thermal analysis indicated that it contained 24% bayerite.

Sample 5 was formed using hydrated alumina formed as in Example 1 by rewashing the alumina produced by successive decantation washing to reduce the sulfate content to about 0.5% by weight as $SO_3$. It had a much higher bayerite content than did Sample 4 when simultaneously tested.

Each of the five samples was pelleted and dried as in the previous examples, and portions subjected to calcination and Cat A cracking and then subjected to "G" steaming and then subjected to Cat A cracking.

The following results were obtained:

Table 6

|  | Percent Gasoline | | Percent Gas | | Percent Carbon | | Gas Density | |
| --- | --- | --- | --- | --- | --- | --- | --- | --- |
|  | F | S | F | S | F | S | F | S |
| Sample 1 | 33.7 | 27.6 | 10.7 | 5.82 | 4.82 | 2.66 | 1.17 | .93 |
| Sample 2 | 33.2 | 30.0 | 9.61 | 6.62 | 4.85 | 3.22 | 1.13 | 1.11 |
| Sample 3 | 35.3 | 32.7 | 11.4 | 7.36 | 5.49 | 3.31 | 1.18 | 1.15 |
| Sample 4 | 37.4 | 33.0 | 11.4 | 7.30 | 5.57 | 3.38 | 1.27 | 1.12 |
| Sample 5 | 34.2 | 33.5 | 12.4 | 6.54 | 5.43 | 3.05 | 1.10 | 1.10 |

It will be observed that the catalyst is improved in the promoting activity after steaming as the sulfate content of the alumina is reduced and that washing beyond a sulfate content of about 5–6% gave little improvement but that a substantial increase above this sulfate test caused a substantial depreciation in activity. However, it was also observed that the washing to remove the excessive content of sulfate resulted in a large increase in the bayerite fraction which degraded the pellet hardness and made them less resistant to fragmentation and abrasion.

Thus, to produce the desirable catalyst as described above we desire to limit the contact time of the hydrated alumina and free ammonia and to limit the degree of washing to hold the sulfate content of the hydrated alumina to within the range of above about 1% and less than 6%, expressed as $SO_3$ and based on $Al_2O_3$. By employing the controls stated in Example 1, we may obtain hydrated alumina which will be within the preferred range of about 1.5 to 2.5% as $SO_3$ based on $Al_2O_3$.

As has been stated above a characteristic property of the hydrated alumina which gives us the unique and useful results reported above arises, in our view, because the hydrated alumina formed by our process is formed in the presence of free ammonia and is alkaline with free $NH_4OH$ in solution throughout the precipitation of the hydrated alumina. By free $NH_4OH$ we mean that the solution has a pH of about 10 or more resulting from the presence of $NH_4$ cations in sufficient excess over anions to establish at least this pH of 10. Preferably the free NH₄OH should be present in excess of about 2–3% NH₄OH and preferably also in the absence of any material concentration of alkali hydroxide contribution to this alkalinity.

Thus, instead of using alum we may employ an alum solution or aluminum sulfate solution and add the solution to an ammonia solution of such concentration that when the desired quantity of the aluminum sulfate (or alum solution is added) the terminal concentration of free NH₄OH is of the above order, i.e., at least 2 or more percent NH₄OH. This is illustrated in the following Example 7 wherein the results obtained are compared with the results obtained when the catalyst is made in accordance with the procedures of Example 2.

EXAMPLE 7

In the following an acid treated halloysite (20% volatile matter) was pelleted and tested in the same manner as the acid treated halloysite of Example 2. This is Sample 1. Another portion of the halloysite used in Sample 1 prior to pelleting was mixed with a large excess of ammonium hydroxide and a solution of substantially iron free aluminum sulfate (under 0.1% Fe₂O₃) was added to the slurry of clay under violent agitation. An amount of aluminum sulfate added was sufficient to form alumina hydrate equal to 15% of Al₂O₃ based on the clay used calculated as voltatile free. By the end of mixing the terminal pH of the solution was 10.4 showing the presence of free NH₄OH in the solution. The clay carrying the added alumina was separated from the solution and washed with water. The mixture was then worked in a dough mixer and dried to adjust the moisture content to that suitable for exrusion (about 45% volatile matter) extruded and dried as described in the other examples. It is called Sample 2.

Another portion of the halloysite used in Sample 1 was, prior to pelleting, mixed with hydrated alumina as in Example 2 employing alumina hydrate of the type used in Example 2 in the amount equal to that used above in this example, i.e., 15% Al₂O₃ and extruded and dried as in the other examples. This is Sample 3. Each of the samples was subjected to calcination and steaming and Cat A treatment in like manner. The following results were obtained:

*Table 7*

|  | Percent Gasoline | | Percent Gas | | Percent Carbon | | Gas Density | |
|---|---|---|---|---|---|---|---|---|
|  | F | S | F | S | F | S | F | S |
| Sample 1 | 35.6 | 27.6 | 11.2 | 5.82 | 4.74 | 2.6 | 1.16 | .93 |
| Sample 2 | 36.4 | 32.2 | 10.5 | 7.56 | 4.69 | 3.24 | 1.27 | 1.16 |
| Sample 3 | 37.5 | 33.0 | 11.4 | 7.30 | 5.57 | 3.38 | 1.27 | 1.12 |

It will be observed that the properties of the alumina supported catalyst produced by the above procedures are substantially similar in activity, both fresh and steamed, indicating that the same form of alumina hydrate is formed.

The following example compares the activity of catalysts formed by addition of hydrated alumina formed as in our invention and also as formed by neutralization of aluminum sulfate where the alumina hydrate is not formed from the alkaline side, i.e., in the presence of excess of ammonia but from the acid side by the addition of ammonia to aluminum sulfate solution to neutralize the aluminum sulfates.

EXAMPLE 8

An acid treated halloysite similar to that used in Example 7 was pelleted and dried as described in Example 7. This is called Sample 1.

To prepare Sample 2, a solution of 4000 grams of the alum formed as in Example I was dissolved in 14 liters of water. Ammonia was added at the rate of 10 liters per minute. Precipitation started at 85° C. at a pH of 3.8 and finished at 90° C. at a pH of 6.7. The precipitate was washed with 40 liters of water. The precipitate contained sulfate equal to 13% by weight as SO₃ based on Al₂O₃.

Enough of the above hydrated alumina was incorporated into the acid treated halloysite (Sample 1) in the manner of Example 2 to add 15% Al₂O₃ and extruded as in Example 2 and dried (this is called Sample 2).

Another portion of Sample 1 halloysite, prior to pelleting, was combined with hydrated alumina, in the manner of Example 2 employing hydrated alumina formed as in Example 1 from another portion of the alum employed in making the hydrated alumina used in producing Sample 2. The resulting material containing 15% Al₂O₃ was extruded and dried. This is called Sample 3. Each of the samples was calcined and steamed and subjected to Cat A cracking as in the previous examples. The following results were obtained:

*Table 8*

|  | Percent Gasoline | | Percent Gas | | Percent Carbon | | Gas Density | |
|---|---|---|---|---|---|---|---|---|
|  | F | S | F | S | F | S | F | S |
| Sample 1 | 39.1 | 29.2 | 9.45 | 4.00 | 4.08 | 1.17 | 1.33 | 1.08 |
| Sample 2 | 34.9 | 30.0 | 9.45 | 5.19 | 3.54 | 2.38 | 1.28 | 1.07 |
| Sample 3 | 34.4 | 34.8 | 13.0 | 9.3 | 5.79 | 3.22 | 1.30 | 1.25 |

It will be observed that whereas the addition of the alumina hydrate formed from the acid side by neutralization of ammonium alum had substantially no effect on the steamed activity as compared with the activity of the steamed substrate, the hydrated alumina formed from the alkaline side, as in our invention, stabilized the activity of the substrate and gave a steamed activity substantially higher than the steamed activity of the substrate.

EXAMPLE 9

In the following example a raw kaolinite not subject to any acid wash or acid treatment is employed. A typical analysis of this clay is as follows:

Percent SiO₂ = 51.2
Percent Al₂O₃ = 46.4
Percent Fe₂O₃ = .3
Percent TiO₂ = 2.2

The clay ground to suitable size was extruded and dried in the manner described in connection with the previous examples. This is called Sample I.

Other fractions were mixed, in the manner described in connection with Example 2, with the hydrated alumina prepared in the manner described in connection with Example 1, extruded and dried in the manner described in Example 2. Different amounts of hydrated alumina were employed to give in Sample 2, 15% Al₂O₃; Sample 3, 40% Al₂O₃; Sample 4, 65% Al₂O₃; Sample 5, 100 parts Al₂O₃.

Another fraction was mixed with hydrated alumina formed by precipitation from alum solution similar in manner to that of Sample 2 of Example 8, that is an ammonium alum solution was neutralized by addition of ammonium hyproxide to the alum solution. The resultant gelatinous alumina precipitate was filtered and washed to remove ammonium salt impurities. It was then mixed with another portion of the kaolinate in the manner of Example 2 sufficient to give 65% Al₂O₃. It is called Sample 6. A portion of each of these samples was calcined and steamed and such subjected to the cracking process in the Cat A method in the manner described in connection with the previous examples. The following results were obtained:

Table 9

| | Percent Gasoline | | Percent Gas | | Percent Carbon | | Gas Density | |
|---|---|---|---|---|---|---|---|---|
| | F | S | F | S | F | S | F | S |
| Sample 1 | 16.6 | 15.4 | 1.85 | 1.68 | 1.13 | .76 | .81 | .98 |
| Sample 2 | 22.9 | 23.7 | 2.72 | 2.94 | 1.71 | 1.44 | .73 | 1.02 |
| Sample 3 | 21.4 | 27.6 | 3.18 | 5.12 | 2.47 | 1.90 | .70 | 1.20 |
| Sample 4 | 18.5 | 32.2 | 4.40 | 4.75 | 3.24 | 2.31 | .71 | 1.11 |
| Sample 5 | 17.4 | 33.4 | 4.66 | 6.65 | 3.01 | 2.99 | .78 | 1.20 |

It will be observed that the catalyst produced by employing hydrated alumina produced according to our invention showed a catalytic activity after steaming higher than that of the unsteamed catalyst and higher than the raw clay. In fact, the raw kaolinite, which has a relatively low catalytic activity both fresh and steamed, was raised to an activity particularly when subjected to steam at high temperature comparable in kind if not in degree with the acid treated bentonites, acid treated halloysite and synthetic catalysts before and after steaming. It may be termed an active cracking catalyst as compared with the inactive raw clay.

A comparison of Sample 4 and Sample 6 confirms the results shown in Example 8, that the hydrated alumina deposited from the alkaline side is superior to the hydrated alumina precipitated from the acid side as a catalyst promotor for cracking catalysts.

Table 10

| | Percent Gasoline | | Percent Gas | | Percent Carbon | | Gas Density | |
|---|---|---|---|---|---|---|---|---|
| | F | S | F | S | F | S | F | S |
| Sample 4 | 18.5 | 32.2 | 4.40 | 4.75 | 3.24 | 2.31 | .71 | 1.11 |
| Sample 6 | 19.3 | 19.0 | 2.90 | 2.87 | 1.94 | 1.25 | .79 | .88 |

It will be observed that the results of Example 9 show an appreciation of the catalyst activity in steaming and a large appreciation of the catalytic activity over that of the raw clay raising the essentially catalytically inactive raw clay to a relatively high level of activity after steaming. The alumina formed in the acid environment gave a much less appreciation and had such a low activity as to be termed inactive.

A recapitulation of the data (Table 11) given above will show the relative effectiveness of the treatment employing the alumina hydrate formed according to our invention and the relative effect of acid treatment and addition of alumina to a raw clay. It also shows the comparative effect of the addition of hydrated alumina, according to our invention, and alumina formed by precipitation in an acid environment.

For the purpose of comparing the stability of the catalyst we may describe as a characteristic of a catalyst, its steam stability in terms of its steaming factor which may be defined as the ratio of the catalyst activity after steaming (S value) to the activity of the fresh catalyst (F value), as indicative of its behavior when subjected to high temperature steam.

A steaming factor less than one means that the catalyst activity is depreciated on steaming and if greater than one it means that the catalyst activity is appreciated on steaming. By this convention, the greater the value of the steaming factor, the more stable the catalyst.

The promotion index may be taken as the ratio of the activity after steaming (S value) of a catalyst before and after it is subjected to a specific treatment. By this convention an index of one means no promotion and the greater the index above one, the greater the promotion.

Table 11

| Ex. | Type | Steaming Factor | | | | Promotion Index | | | |
|---|---|---|---|---|---|---|---|---|---|
| | | Raw [1] | Promoted by— | | | $Al_2O_3$ only [2] | Effect of— | | |
| | | | $Al_2O_3$ [2] | Acid Treat | | | Acid Treat | | |
| | | | | Only [3] | $+Al_2O_3$ [4] | | Only [3] | $Al_2O_3$ [4] | |
| | | | | | | | | Raw [5] | AT [6] |
| 8 | H | | | .75 | 1.00 | | | | 1.19 |
| 7 | H | | | .78 | .88 | | | | 1.20 |
| 2 | H | | | .82 | .83 | | | | 1.18 |
| 3 | K | 1.03 | 1.22 | .80 | 1.29 | 1.67 | 1.15 | 2.2 | 1.91 |
| 9 | K | .93 | 1.03 | | | 1.54 | | | |
| 4 | B | | | .81 | .86 | | | | 1.08 |
| 5 | SC | .78 | .81 | | | 1.07 | | | |
| 8 | H | | | .75 | [7].86 | | | | [7]1.03 |
| 9 | K | .93 | [8].99 | | | [8]1.23 | | | |
| 9 | K | .93 | [9]1.74 | | | [9]2.09 | | | |

H=halloysite, K=kaolin or kaolinite, B=bentonite, SC=synthetic.
Steaming factor, S/F ratio of catalyst.
Promotion index S of treated catalyst÷S of reference catalyst.
[1] Raw, i.e., not acid treated.
[2] Alumina formed from basic side added to raw base—15%.
[3] Clay (A.T.) treated with acid only—no alumina added.
[4] Alumina added to acid treated clay—15%.
[5] Where the reference catalyst is the untreated clay or synthetic catalyst.
[6] Where the reference catalyst is the acid treated clay.
[7] Hydrated alumina precipitated from acid side—15% $Al_2O_3$.
[8] Alumina precipitated from acid side—65% $Al_2O_3$.
[9] Alumina precipitated from alkaline side—65% $Al_2O_3$.

It will be observed that the alumina promoted catalyst according to our invention improves the stability of the raw base as well as the acid treated base. In fact, the alumina improves the stability of the base as well, and in some cases even more effectively, than does the acid treatment of the base. In the case of the raw clay of Example 3, the promotion effect of the alumina added to the raw clay was markedly superior to the acid treatment of the clay. The degree of improvement of the acid treated clay by added alumina is of as high order as the degree of improvement of the raw clay by added alumina.

It thus appears that clays which may be beneficiated by acid treatment may also be powerfully promoted by alumina according to our invention and may be further improved by acid treatment followed by incorporation of alumina according to our invention.

A comparison of the alumina promoted catalyst produced according to our invention and with alumina formed by precipitation from the alkaline side shows further that the alumina formed from the acid side is much inferior as a promotor in that it has a much feebler beneficiation effect on stability and activity.

It is therefor our discovery that alumina formed from the alkaline side will promote the activity of substrate bases and convert materials of low activity into catalysts of high cracking activity with stabilities much greater than the substrate base to which the alumina is applied.

In preparing the hydrated alumina, according to our invention, we may mix the aluminum salt of a strong mineral acid with the base, preferably employing aluminum sulfate or ammonium alum and ammonium hydroxide.

The mixture may be made by mixing two streams, i.e., the salt and base, for example, the aqua ammonia and the salt solution, as described above, or by introducing the salt solution or the crystalline salt into the body of the base, for example, aqua ammonia, provided the environment in which the hydrated alumina is precipitated is sufficiently basic. As illustrated by the above description in employing ammonia the solution is sufficiently basic to establish an $NH_4$ ion content in excess of that necessary to balance the anions present in solution, i.e., present as free $NH_4OH$ preferably at a pH above about 10.

The alumina may be first formed and washed and then intimately mixed with the substrate base in the case shown in the flow sheets of Figs. 2 and 3 or may be formed in the presence of the substrate base as in Example 7, and may be subsequently washed. In all such cases, it is desirable that the mixture be formed to provide a uniform distribution of the hydrated alumina over the substrate.

The ratio of the hydrated alumina to the substrate will depend on the nature of the substrate and the level of activity desired. For each substrate there is an optimum value of the percentage $Al_2O_3$ added to give the maximum value of the steaming factor or promotion index. This is illustrated in Example 2. It follows from the fact that the catalytic activity of the hydrated alumina unsupported by a substrate is very low and appears to be of the order of an untreated kaolin. The combined catalyst having a higher steaming factor and a promotion index above 1 indicates a synergistic action and a combination which has different characteristics from its elements. Thus, the proper percent of $Al_2O_3$ to be added can be determined by applying the tests described above.

This percentage of $Al_2O_3$ added may be from about 1% to 100% of $Al_2O_3$ added, for example, about 10% to 30% of $Al_2O_3$ added. The combined catalyst may be shaped as by extrusion as described above or by pilling in a compression mold of a pilling machine. It may however be in granular form as described above depending on the cracking process in which it is to be employed.

The catalyst prior to introduction into the catalytic process is dried and more frequently also calcined during which calcination steam may be applied. It may however not be calcined since it is always subjected to high temperatures and steam in the cracking process.

The catalyst formed according to our process, prior to calcination, carries the alumina in the form of hydrated alumina of the composition containing the proportions of bayerite, boehmite and amorphous aluminum hydrate and characteristics described above.

The percentage composition of the aluminum trihydrate referred to above as employed in our invention was determined by application of the method of differential thermal analysis reported in "Differential Thermal Analyses of Clay, Minerals and other Hydrous Materials," by Ralph E. Grim and Richards A. Rowland, American Mineralogist, vol. 27, No. 11, pages 746–761, 1942, and vol. 27, No. 12, pages 801 to 818, 1942. Standards were made by mixing hydrated alumina of known composition as to bayerite, boehmite and amorphous hydrated alumina content and each mixture is subjected to such thermal analysis. The sample of hydrated alumina to be employed in forming our catalyst is also subjected to such differential thermal analysis and its composition determined by comparing the results obtained from the thermal analysis of the test sample and that of the standards.

On calcination the hydrated alumina is, it is believed, converted to the gamma form and the characteristics of the calcined catalyst given above is, it is believed, the characteristics of the catalyst carrying the gamma alumina formed from the particular nature of the hydrated alumina incorporated into the catalyst, according to our process.

After calcination, the catalyst, when cooled, adsorbs moisture from the atmosphere. Thus, whenever in our claims we refer to added alumina we mean either the hydrated alumina formed by precipitation of the hydrated alumina from the basic side, as described above, or the $Al_2O_3$ formed by heating the combined catalyst thus formed, i.e., the substrate base carrying the hydrated alumina precipitated from the basic side.

Where we employ, in the claims, the phrase consisting essentially of a catalytic substrate and added alumina we mean the alumina described above, excluding ingredients in amounts which materially interfere with or materially impair the catalytic activity of the catalyst as a cracking catalyst but not excluding other ingredients or addition agents which do not, or do not in the amounts included, materially interfere with or impair the essential catalytic activity of the catalyst formed according to our invention.

While we have described a particular embodiment of our invention for the purpose of illustration, it should be understood that various modifications and adaptations thereof may be made within the spirit of the invention as set forth in the appended claims.

We claim:

1. A cracking catalyst consisting essentially of a substrate and alumina, said alumina derived from hydrated alumina formed by precipitation from a salt of aluminum in an aqueous solution having a pH in excess of 10 and containing free ammonia in an amount equivalent to at least about 1% by weight of the solution during the entire period of said precipitation, and said hydrated alumina containing also sulfate in amount ranging from about 0.5 to less than 10% calculated as $SO_3$ based on $Al_2O_3$ content of said hydrated alumina.

2. A composition of matter adapted for conversion to a cracking catalyst by heating, said composition of matter consisting essentially of a substrate and hydrated alumina derived by precipitation from a salt of aluminum in aqueous solution having a pH in excess of 10 and containing free ammonia in amount equivalent to about 1% to about 5% by weight of the solution during the entire period of said precipitation and containing a sulfate equavalent to about 1.5% to about 5% calculated as $SO_3$ and based upon $Al_2O_3$ content of said hydrated alumina.

3. A composition of matter according to claim 2 in which the substrate is a kaolin.

4. A method for forming a catalyst precursor which comprises mixing an aluminum salt of a strong mineral acid with an aqueous solution of ammonium hydroxide, forming hydrated alumina in the presence of free ammonium hydroxide in said solution, maintaining said solution at a pH in excess of 10 and with a free ammonium hydroxide concentration equivalent to at least about 1% by weight of the solution during the entire period of said formation, separating the precipitated hydrated alumina from the solution containing free ammonium hydroxide, washing the precipitated hydrated alumina, and mixing the hydrated alumina with a substrate.

5. In the process of claim 4 in which the aluminum salt is ammonium alum and the hydrated alumina is washed to produce a washed hydrated alumina containing sulfate in amount within the range of from about 0.5% to about 9% calculated as weight percent of $SO_3$ based on volatile free $Al_2O_3$.

6. In the process of claim 4 in which the free ammonium hydroxide is present in amounts within the range equivalent to from about 1.5% to about 5% by weight of the solution.

7. In the process of claim 4 in which the solution is at a pH of about 10 to 11 and contains free ammonium hydroxide in amounts within the range equivalent to about 3% to about 5% by weight of the solution.

8. A process of catalytic cracking of hydrocarbons heavier than gasoline which comprises passing vapors of such hydrocarbons in contact with a dehydrated catalyst according to claim 1 at an elevated cracking temperature, and separating gasoline from such vapors.

9. A method for forming a catalyst precursor which comprises mixing an aluminum salt of sulphuric acid with an aqueous solution of ammonium hydroxide, reacting the intermixture of said salt and said ammonium hydroxide to form hydrated alumina, maintaining said intermixture at a pH in excess of 10 and with a concentration of at least about 1% free ammonium hydroxide in said intermixture, and producing ammonium sulphate in said solution during the entire period of said reaction in a ratio of about one part by weight of ammonium hydroxide to about five parts by weight of ammonium sulphate, separating the precipitated hydrated alumina from the solution containing the ammonium sulphate and the free ammonium hydroxide, and washing the precipitated hydrated alumina.

10. In the method of claim 9 mixing the washed hydrated alumina with a substrate.

11. In the process of claim 4 in which the aluminum salt of a strong mineral acid is crystalline ammonium alum and in which process the ammonium alum crystals are added to a body of an aqueous solution of ammonium hydroxide.

References Cited in the file of this patent

UNITED STATES PATENTS

| | | |
|---|---|---|
| 1,337,191 | Buchner | Apr. 20, 1920 |
| 1,512,897 | Kohlschutter | Oct. 21, 1924 |
| 1,951,443 | Sanders | Mar. 20, 1934 |
| 2,253,285 | Connolly | Aug. 19, 1941 |
| 2,398,610 | Bailey et al. | Apr. 16, 1946 |
| 2,432,286 | Claussen et al. | Dec. 9, 1947 |
| 2,448,960 | Connolly | Sept. 9, 1948 |
| 2,467,271 | Peer | Apr. 12, 1949 |
| 2,504,001 | Connolly | Apr. 11, 1950 |
| 2,582,956 | Bond | Jan. 22, 1952 |
| 2,584,148 | Mills | Feb. 5, 1952 |
| 2,701,793 | Ashley | Feb. 8, 1955 |
| 2,775,562 | Dinwiddie et al. | Dec. 25, 1956 |
| 2,782,144 | Pardee | Feb. 19, 1957 |
| 2,787,522 | Le Francois | Apr. 2, 1957 |